Sept. 12, 1961     J. A. MARISON     2,999,524
TUBELESS TIRE-RIM AND SPRING UNIT SUPPLEMENT Filed Jan. 5, 1960     2 Sheets-Sheet 1

INVENTOR.
JOHN A. MARISON
BY
ATTORNEYS

Sept. 12, 1961  J. A. MARISON  2,999,524
TUBELESS TIRE-RIM AND SPRING UNIT SUPPLEMENT
Filed Jan. 5, 1960  2 Sheets-Sheet 2

INVENTOR.
JOHN A. MARISON
BY
Victor J. Evans & Co.
ATTORNEYS

2,999,524
TUBELESS TIRE-RIM AND SPRING UNIT SUPPLEMENT
John A. Marison, 40 N. 8th St., San Jose 12, Calif.
Filed Jan. 5, 1960, Ser. No. 570
2 Claims. (Cl. 152—6)

This invention relates to means for preventing collapsing of tubeless tires, and in particular a continuous assembly of spring and bumper units radially positioned and circumferentially spaced on a rim of a wheel and positioned in a tubeless tire whereby upon deflation of the tire the load is taken by the spring and bumper units.

The purpose of this invention is to provide means for protecting side walls of tubeless tires particularly when a blow-out occurs in a tire or when a tire, on a vehicle traveling at high speed engages an obstruction whereby accidents resulting from collapsing of tubeless tires are substantially eliminated.

Conventional tubeless tires are supported by air under pressure and because of a sealing lining such tires are not subject to deflation by small punctures or the like. However, due to unbalanced wheels and improper alignment tubeless tires may wear thin at points and blow-outs may occur. With this thought in mind this invention contemplates a combination spring and bumper unit positioned at spaced points throughout the interior of a tubeless tire whereby upon failure of a tire the load is taken by the spring and bumper units.

The object of this invention is, therefore, to provide means in a tubeless tire for taking the load upon failure of the tire.

Another object of the invention is to provide positive protection against blow-outs of tubeless tires.

Another important object of the invention is to protect side walls of tubeless tires.

A further object of the invention is to improve the riding of tubeless tires over rough terrain by supporting the tires from the inside with units combining springs and rubber bumpers.

A still further object of the invention is to provide supporting means in a tubeless tire in which the combination of the supporting means and tire are of simple and economical construction.

With these and other objects and advantages in view the invention embodies a circular rim for a tubeless tire having flanges at the sides for retaining the tire in position thereon and a plurality of coil springs carried by spring gripping washers on the rim of the wheel and in which rubber bumpers are mounted in outer ends of the springs.

Other features and advantages of the invention will appear from the following description taken in connection with the drawings, wherein.

Figure 1:
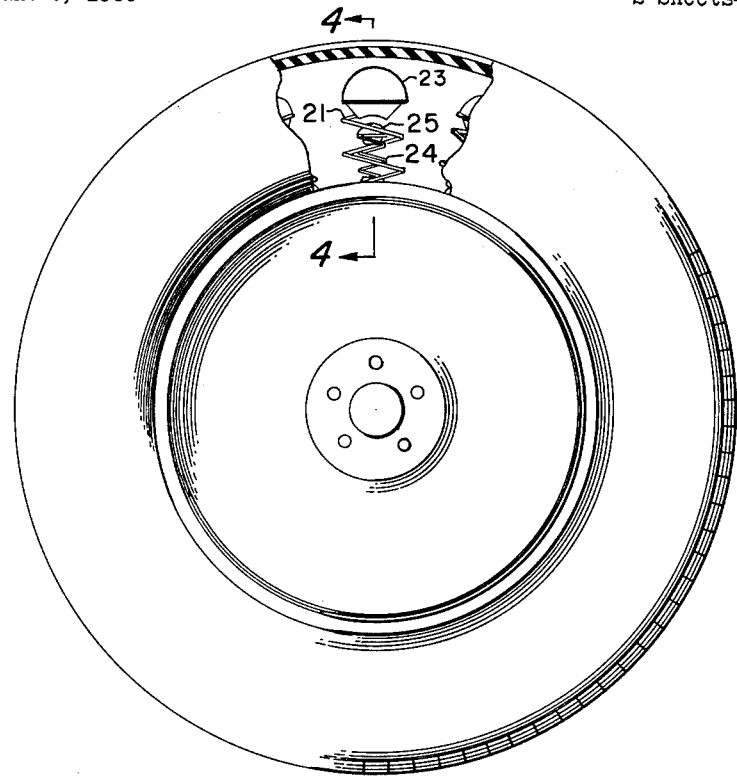
FIGURE 1 is a side elevational view of a wheel having a tubeless tire thereon with part of a side wall of the tire broken away showing a combination spring and bumper assembly positioned in the tire and mounted on the rim thereof.
Figures 2, 3:
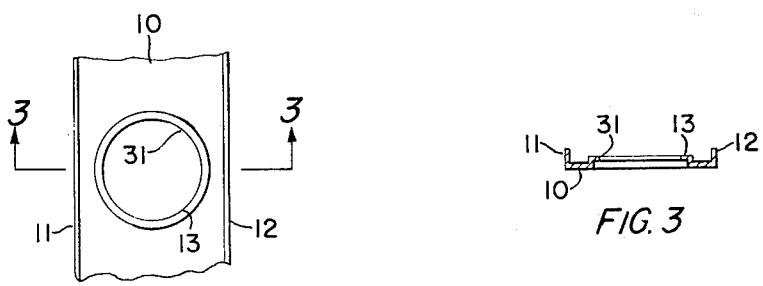
FIGURE 2 is a plan view of a section of the rim of the wheel shown in FIGURE 1 showing an opening for one of the supporting units extended through the rim.
FIGURE 3 is a cross-section through the rim taken on line 3—3 of FIGURE 2.

Referring now to the drawings wherein like reference characters denote corresponding parts the tubeless tire support of this invention includes a rim 10 having flanges 11 and 12 for holding a tire extended from the edges and having a plurality of off-set flanges 13 with openings 14 therein stamped from the rim and extended outwardly therefrom, an outer spring gripping washer 15 having a flange 16 nested in the off-set portion 17 of the flange 13, an inner spring gripping washer 17 having a flange 18 nested in the washer 15, a bumper 19 having a flange 20 upon which the flanges of the inner and outer spring gripping washers are positioned, an outer spring 21 positioned with the lower coil in the washer 15 and with the upper coil 22 embedded in a head 23, and an inner spring 24 positioned with the lower coil in the washer 17 and with the upper coil or convolution embedded in a bumper 25, the upper surface 26 of which is positioned to co-act with a lower surface 27 of the head 23.

The rim 10 is positioned on a band 28 and the band 28 is retained on a wheel by a rim lock 29.

Figures 5, 6:
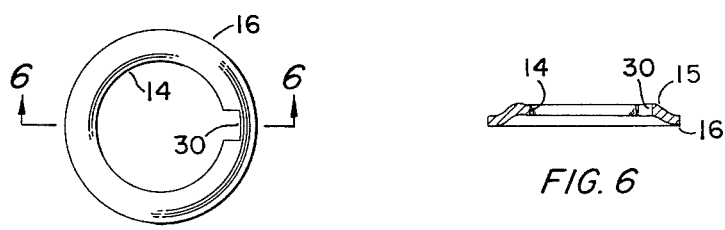
FIGURE 5 is a plan view of one of the spring gripping washers showing a notch through which the end of the spring is inserted.
FIGURE 6 is a cross-section through the spring gripping washers taken on line 6—6 of FIGURE 5.

The outer and inner spring grip or spring gripping washers 15 and 17 are illustrated in FIGURES 5 and 6 and it will be noted that inner edges of the washers are provided with notches 30 through which the end convolutions of the spring are threaded into the washers.

Figure 4:
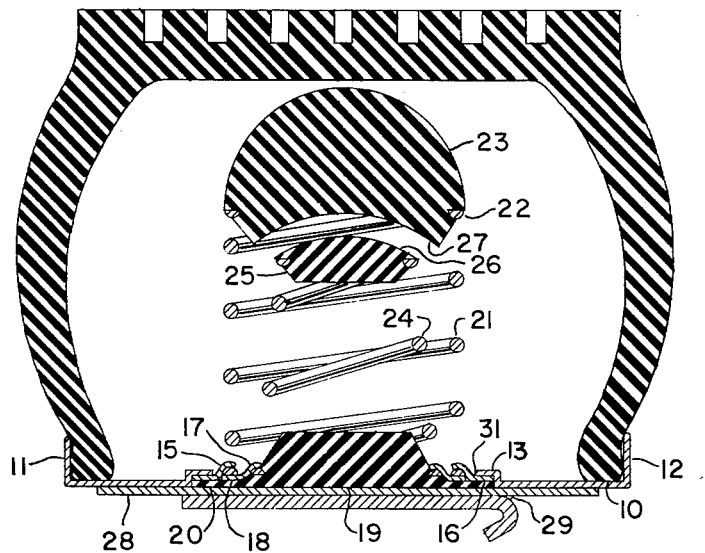
FIGURE 4 is a cross-section through a rim and also through a tubeless tire positioned on the rim with the section taken on line 4—4 of FIGURE 1 and with the parts shown on an enlarged scale.

The flanges 13 extend around openings 31 in the rim 10 and, as illustrated in FIGURE 4, the spring units with the rubber heads and bumpers are of such a size that the complete units pass through the openings 31 and the openings 31 are circumferentially spaced throughout the circumference of the rim 10.

By removing the rim lock 29 the complete tubeless tire assembly is removed from a wheel and the spring and bumper elements may be removed from the rim to facilitate repair and replacement. Each unit is independent and the units may be removed and replaced without disturbing other units.

Upon collapsing of a tubeless tire in which the spring and bumper units are positioned the outer wall of the tire engages the head 23 moving the head inwardly until it engages the bumper 25 so that the outer wall of the tire is supported by both the inner and outer springs.

The outer spring is preferably cylindrical whereas the inner spring may be tapering with the large convolution in the spring grip 17 and the small convolution at the upper end embedded in the bumper 25.

Upon collapsing of a tubeless tire in which the spring and bumper units are positioned an operator of the vehicle may continue to his destination without repairing or replacing the tire.

It will be understood that modifications, within the scope of the appended claims, may be made in the design and arrangement of the parts without departing from the spirit of the invention.

What is claimed is:

1. A tubeless tire supporting assembly comprising a rim having flanges at the sides for retaining a tubeless tire thereon, said rim having circumferentially spaced radially disposed openings extending therethrough, an outer spring gripping washer positioned in each of said openings, a spring secured on said outer spring gripping washer, a head of elastic material carried by said spring, an inner spring gripping washer positioned within the outer spring gripping washer, an inner spring mounted in and extended from said inner spring gripping washer, a bumper of resilient material secured in the outer end of the inner spring, and a rim lock for securing the rim in position on a wheel.

2. A tubeless tire support comprising a rim having flanges extended outwardly from the edges for retaining a tire on the rim, said rim having circumferentially spaced radially disposed openings extended therethrough and said rim having off-set flanges extended around said openings, an outer spring retaining washer having an off-set inner edge portion positioned with the outer edge portion thereof nested in each of the flanges around the openings of the rim, an outer spring positioned with the inner end thereof secured in position by the off-set inner edge portion of the outer spring retaining washer, a head of resilient material secured in the outer end of the outer spring, an inner spring retaining washer also having an off-set inner edge portion with the outer edge portion thereof nested within the inner edge portion of the outer spring retaining washer, an inner spring positioned with the inner end thereof secured in position by the offset inner edge portion of the inner spring retaining washer, a bumper of resilient material secured in the outer end of the inner spring, a bumper having a flange positioned in the inner spring retaining washer, the flange of said bumper extending beneath said inner and outer spring retaining washers, a band positioned against the flange of said bumper providing sealing means for a tubeless tire on the rim, and a rim lock for securing the rim in position upon a wheel.

References Cited in the file of this patent

UNITED STATES PATENTS

| | | |
|---|---|---|
| 1,245,910 | Hathaway | Nov. 6, 1917 |
| 1,344,012 | Wileman | June 22, 1920 |
| 1,463,064 | Sequeira | July 24, 1923 |

OTHER REFERENCES

Germany, application No. B25,347 II/63e, Jan. 19, 1956.